K. PROBST.
TRANSMISSION GEARING.
APPLICATION FILED JUNE 26, 1911.

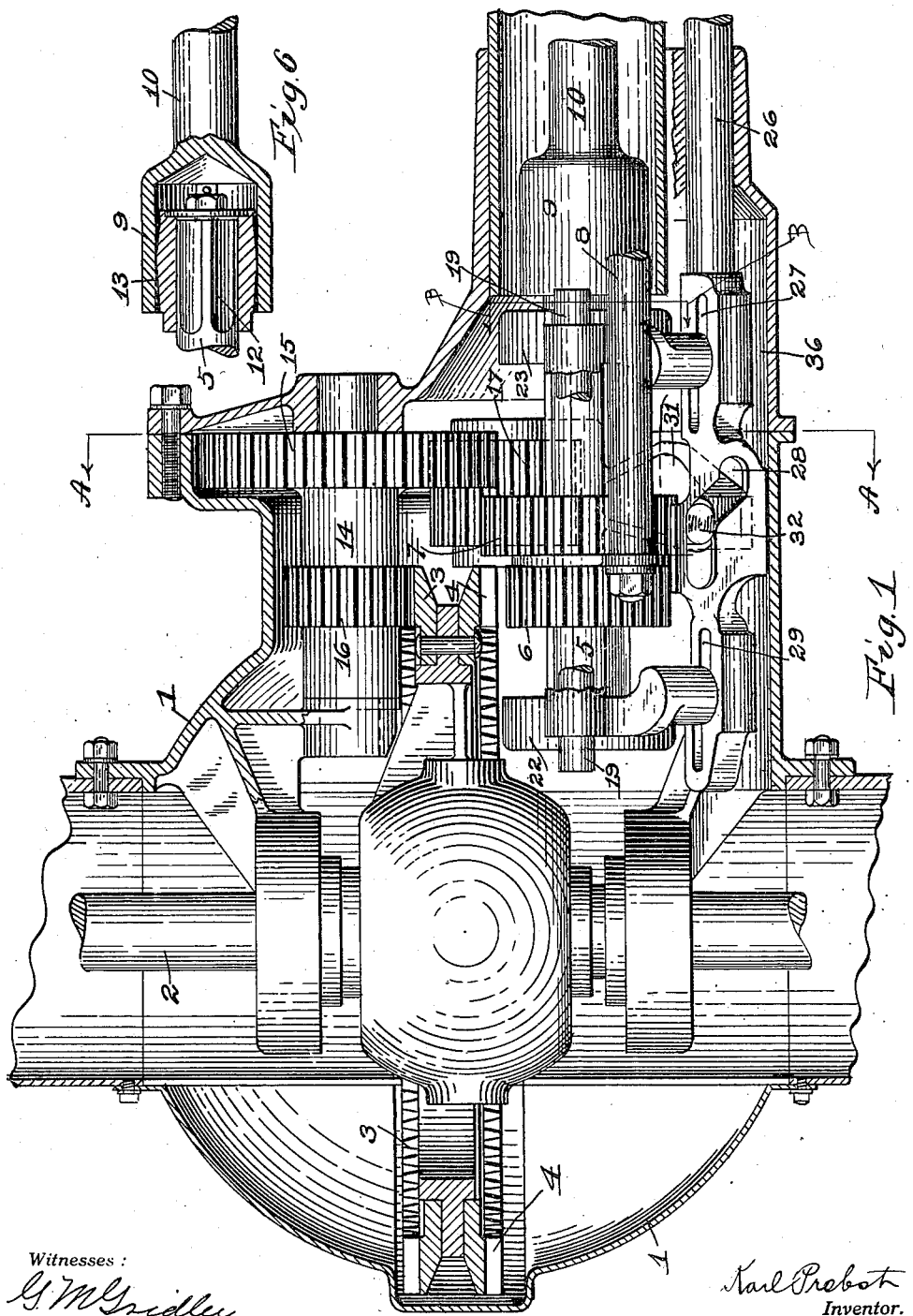

1,082,907.

Patented Dec. 30, 1913.
4 SHEETS—SHEET 2.

Witnesses:

Karl Probst Inventor.

Attorney.

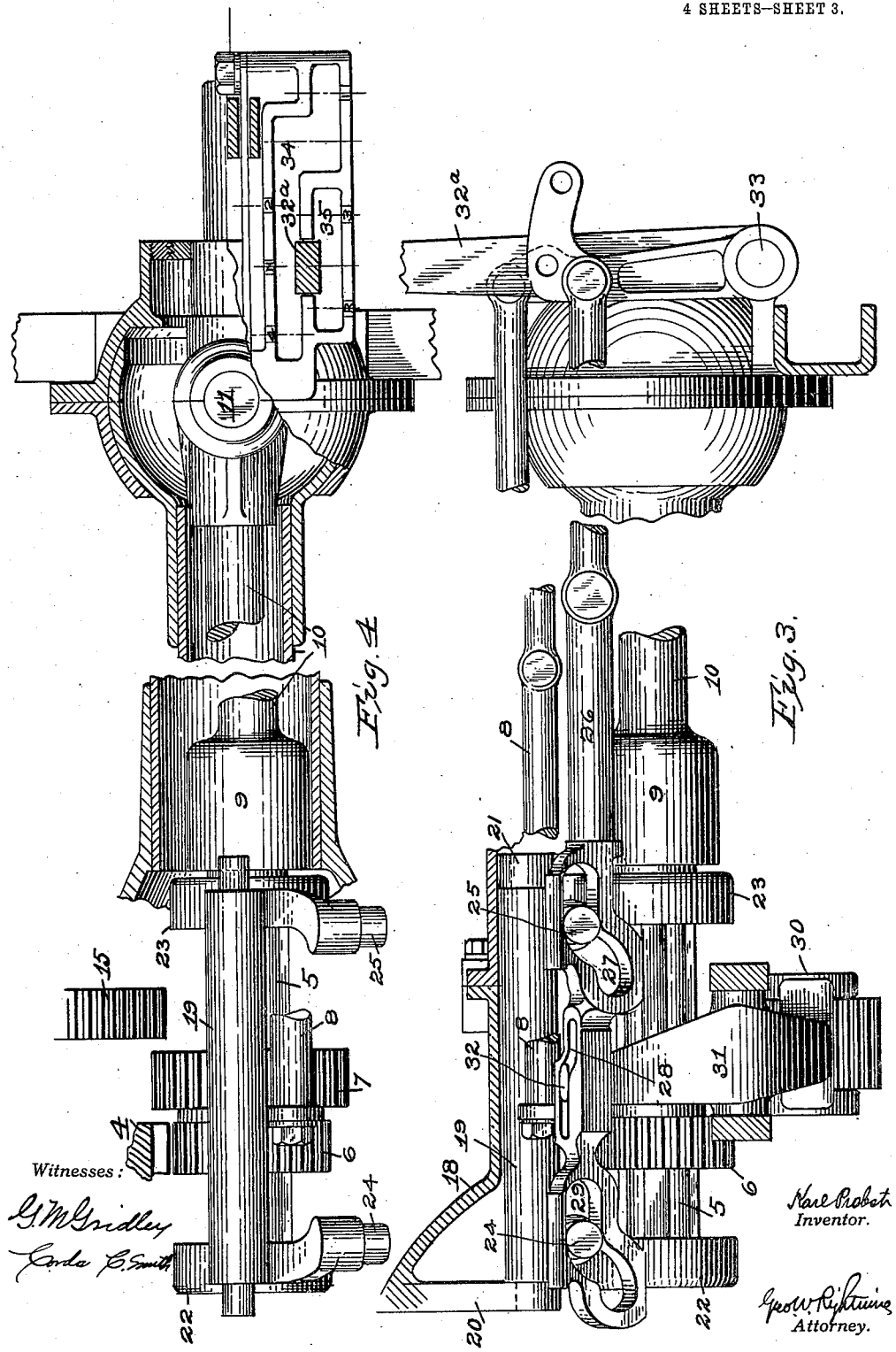

K. PROBST.
TRANSMISSION GEARING.
APPLICATION FILED JUNE 26, 1911.

1,082,907.

Patented Dec. 30, 1913.

4 SHEETS—SHEET 4.

WITNESSES
H. Schneider
Wm C. Mills

INVENTOR
Karl Probst

BY
Geo. W. Rightmire
ATTORNEY

UNITED STATES PATENT OFFICE.

KARL PROBST, OF COLUMBUS, OHIO, ASSIGNOR TO THE STONE-PROBST AXLE COMPANY, OF COLUMBUS, OHIO, A CORPORATION OF OHIO.

TRANSMISSION-GEARING.

1,082,907.
Specification of Letters Patent.
Patented Dec. 30, 1913.

Application filed June 26, 1911. Serial No. 635,397.

*To all whom it may concern:*

Be it known that I, KARL PROBST, a citizen of the United States, residing at Columbus, in the county of Franklin and State of Ohio, have invented certain new and useful Improvements in Transmission-Gearing, of which the following is a specification.

My invention relates to improvements in transmission gearing and the means of manipulating the same; it includes especially, in combination with crown gears on the driven shaft, a plurality of pinions slidably mounted on the driving shaft, means for positioning the driving shaft, a secondary shaft having fixed pinions thereon, and a reverse pinion so mounted as to be adjusted by the same means which positions the driving shaft. The manipulating and adjusting means are controlled by levers within easy reach of the driver as usual.

Figure 5:
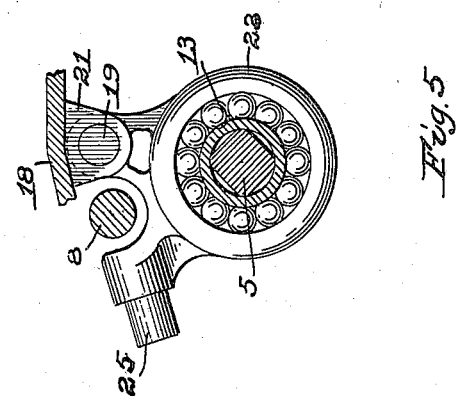
Figure 2:
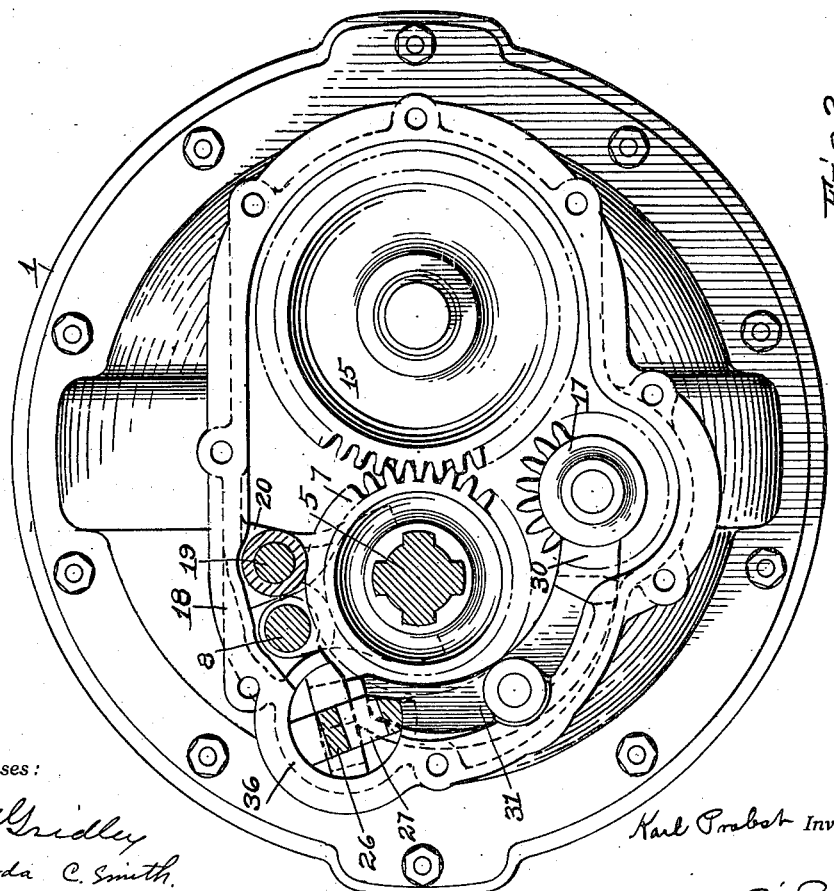
Figure 7:
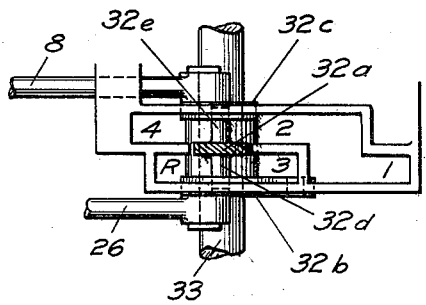
Figure 8:
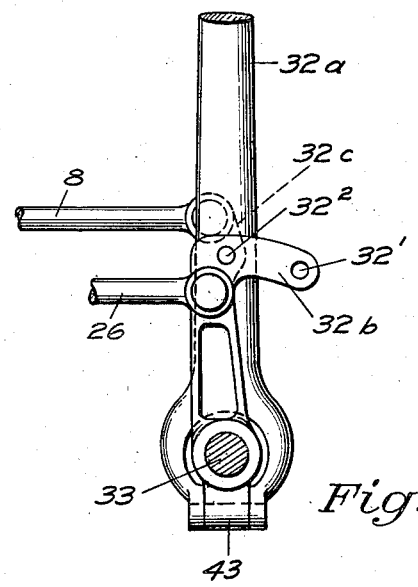
Figure 9:
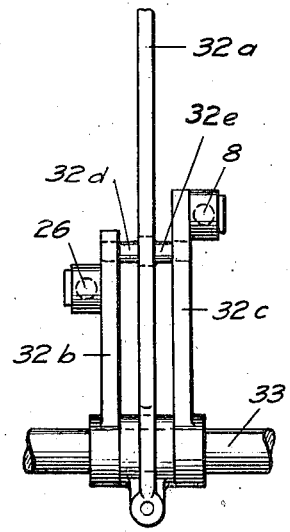
Figure 10:
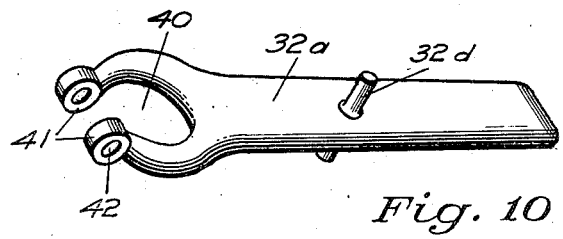

Referring to the drawings which are hereto attached and made a part of this specification, Figure 1 is a top view with the casing removed, showing the transmission gearing and the associated parts; Fig. 2 is a section along the line A—A of Fig. 1; Fig. 3 shows the suspending and manipulating means for the driving shaft, in side view, the casing and associated parts being removed; Fig. 4 shows a top view of the manipulating features of the driving shaft and the controller; Fig. 5 is an end view partly in section of the suspending means for the driving shaft taken along the line B—B of Fig. 1; Fig. 6 shows the construction to permit the lateral swing of the driving shaft in the square end of the shaft which operates the same; Fig. 7 is a top view of the slot construction shown in Fig. 4 in which the lever 32ᵃ is manipulated; Fig. 8 is a view showing the connection between rods 8 and 26 and the operating lever 32, and also showing the mounting of lever 32ᵃ; Fig. 9 is a view showing the manner of connecting the lever 32ᵃ with the stub levers associated with the rods 8 and 26; Fig. 10 is a perspective of a portion of the rod 32ᵃ showing its formation.

In the drawings, 1 is the casing surrounding the transmission gearing and the associated parts; 2 is the driven shaft having the double faced crown gear 3, 4, thereon; 5 is the driving shaft having slidably mounted thereon the pinions 6 and 7 which are manipulated by the rod 8, as will be hereinafter described. The driving shaft at one end fits into the square head 9 of the shaft 10 which operates the same, and which at its other end is mounted with a ball-and-socket construction 11, shown in Fig. 4. This ball-and-socket construction permits some swinging motion of the shaft 10, whereby the engaged end 12 of the driving shaft 5 may be swung laterally. There is sufficient play in the square end 9, and the ends of driving shaft 5 is formed on a large arc as shown at 13, so that the lateral swing of the driving shaft may be accommodated and the shaft may be swung as a unit.

The countershaft 14 is mounted in a casing in the usual way and carries in fixed position thereon the pinions 15 and 16; pinion 16 is in constant mesh with the crown gear 3, whereas pinion 15 is adapted to be enmeshed with the pinions 6 and 7, and also with the reverse pinion 17. By means of rod 8 the gears 6 and 7 are slidably moved on the driving shaft 5, and in the position shown in Fig. 1, pinion 7 is adapted for meshing with crown gear 4 by sliding along the driving shaft in one direction, and pinion 7 is adapted for meshing with pinion 15 by sliding along the shaft 5 in the opposite direction. The position of shaft 5 in Fig. 1 may be spoken of as the normal position, and in that position pinion 7 is adapted for meshing either with the crown gear 4 or the pinion 15 by the proper sliding movement. The position of pinion 7 in Fig. 1 is the neutral position, in which it is out of mesh entirely, but is so positioned that, when the reverse pinion 17 is lifted as hereinafter described, pinions 7 and 17 will mesh, and at the same time pinion 17 meshes with pinion 15, whereby a reverse movement of the driven shaft 2 is accomplished. Pinion 6 is adapted to be thrown into mesh with crown gear 4 or pinion 15 as hereinafter described, it being understood that pinion 6 is moved slidably upon the driving shaft 5 by the rod 8. The speeds attainable by this construction of the transmission gearing are as follows, to-wit:—Pinion 7 meshing with the crown gear 4 produces the highest speed attainable by this device; pinion 7 meshing with pinion 15 produces a third degree of speed by driving off the counter shaft; pinion 6 meshing with crown gear 4 produces the second degree of speed; and when pinion 6 is in mesh with pinion 15, the slowest degree of speed is produced. The function of the reverse pinion is the same as it is in any well known construction.

The construction for mounting and swinging the driving shaft 5 will now be described. Referring to Fig. 3, there is shown the casing at 18 having mounted therein the long pin 19 so as to be free to rotate in the bearings 20 and 21. Formed integrally with this pin or secured thereto, as desired, are the bearing shells 22 and 23, one being shown more clearly in Fig. 5; a ball bearing is provided in these shells for the driving shaft 5. Integrally connected with the shell 22, and likewise with the shell 23, are the pins 24 and 25, and it is seen that if these pins are lifted or depressed, a corresponding rotary movement will be given to the driving shaft 5 about the bearings 20 and 21, of the pin or rod 19, and the construction for lifting or depressing said pins 24 and 25 is shown in detail in Fig. 3. Referring to said Fig. 3, 26 is a rod manipulated from the controller, having three cam slots 27, 28, and 29 formed therein, and as seen in Fig. 3, slots 27 and 29 are formed in a vertical plane and slot 28 is formed in a horizontal plane. Slot 29 receives pin 24 and slot 27 receives pin 25 and as rod 26 is moved longitudinally, each slot moves over its engaged pin from end to end, thereby lifting said pins or depressing them, depending upon the direction of the movement of the rod 26. As positioned in Fig. 3, if the rod 26 be moved to the right, the pin will follow down the slot with the result of rotating the driving shaft 5, whereby the pinion 6 will be swung into mesh with the crown gear 4, and it is readily seen that, if the pinion 6 is moved along the driving shaft 5, a similar swinging movement is imparted to the driving shaft 5 through the pins 24 and 25 by the slots 27 and 29, and said pinion 6 will be enmeshed with pinion 15 on the countershaft. The reverse pinion 17 is mounted in a frame 30, having rock arm 31 thereon, and at the end of said rock arm 31 is a pin 32 which enters the slot 28 formed on the rod 26; as rod 26 is moved to the right in Fig. 3, from the position shown therein, no change takes place in the position of the reverse pinion 17; but if the rod 26 be moved toward the left in Fig. 3; the pin 32 will travel laterally in following the slot, and thereby the reverse pinion 17 will be thrown into mesh. The slots and pins are so associated that the reverse pinion is thrown out of mesh when the driving shaft 5 is rocked to enmesh pinion 6 with either the crown gear 4 or the pinion 15, and when the reverse pinion is thrown into enmeshing position with pinion 7 and pinion 15, driving shaft 5 is rocked away from crown gear 4. The portion of each slot which operates to produce movement in its engaged pin is so placed that no movement is produced in the pin 32 when movement is produced in the pins 24 and 25; for instance, pin 24 as shown in Fig. 3 will be undisturbed by movement of the rod 26 toward the left and the same is true of pin 25; whereas pin 32 will be laterally moved. On the other hand, pins 24 and 25 will be moved by the shifting of the rod 26 toward the right as shown in Fig. 3, whereas, pin 32 will be undisturbed, it being understood that the right or left movement just mentioned is initiated at the points occupied by said pins in Fig. 3.

The operation for bringing the pinion 6 into mesh with crown gear 4, as shown in Fig. 1, will be effected by moving rod 26 toward the right, whereby the driving shaft 5 is swung laterally, thus enmeshing pinion 6 with crown gear 4. To enmesh pinion 6 and pinion 15, starting from the position just described, rod 26 will be moved to rotate the driving shaft away from the crown gear, that is, toward the left, thereupon rod 8 will be operated to slide pinion 6 to a point opposite pinion 15, whereupon rod 26 will be moved toward the right as described above, whereupon pinions 6 and 15 will be brought into mesh. It is clear that when it is desired to mesh pinion 7 with either crown gear 4 or pinion 15, rod 26 will occupy about the position it has in Fig. 3, for in that position the driving shaft 5 is normally suspended, and the reverse pinion 17 is out of meshing position.

Shaft 10 is mounted at 11 with a ball-and-socket connection and at 9 is squared to take over the end of shaft 5; to maintain the parallelism of shaft 5 in its different lateral positions produced by the operations of the cam slots above described, the end of the shaft 5 engaged by the squared portion 9 of shaft 10 is given a slightly rounded or arc form, sufficient to accommodate the shaft 5 to its different positions and at the same time maintain proper contact with the squared end 9 to insure rotation without loss of motion.

The control for manipulating the rods 8 and 26 is shown conventionally in Figs. 3 and 4, and in detail in Figs. 7, 8, 9 and 10. Said lever is pivoted on the bearings 33, and is rotated thereon forwardly and rearwardly, the bearing 33 being a pivotally mounted rod. At its lower end said lever 32$^a$ is bifurcated at 40 to take over the bearing rod 33, and is provided with the extensions 41 thereon having the openings as shown at 42 therein, which are connected to the lug 43 carried on the bearing rod 33, the connection therewith being a pivotal one which permits the lever 32$^a$ to swing laterally; therefore the rod 32$^a$ is so mounted as to have a forward and backward swing, and also a swing from side to side. A stub lever 32$^b$ is mounted on the rod 33, and is provided with an opening 32′ at the end of a hook-like extension thereon, and with a second opening 32². These openings are adapted to be engaged by the pin 32ᵈ on the lever 32ᵃ. Rod 26 is appropriately connected with stub lever 32ᵇ and as the latter is operated rod 26 is likewise operated. Stub lever 32ᶜ is mounted on rod 33 on the opposite side of lever 32ᵃ from stub 32ᵇ, and is provided with an opening adapted for receiving the pin 32ᵉ on lever 32ᵃ. Rod 8 is appropriately connected with stub lever 32ᶜ, and as the latter is moved by the lever 32ᵃ rod 8 is correspondingly moved. In Fig. 7 lever 32ᵃ is shown in section in neutral position. Assume that said lever 32ᵃ is rotated toward the stub lever 32ᶜ until the pin 32ᵉ thereon enters the opening through the said stub lever, and this engagement being effected the lever may be moved in either direction carrying rod 8 therewith. Assume that said lever is moved toward the numeral 4, and thereby pinion 7 is brought into mesh with the crown gear 4 thereby producing the highest degree of speed. If said lever be moved toward the point 2, pinion 7 will be meshed with pinion 15 thereby driving off of the counter shaft and producing the third degree of speed. If the said lever be now moved laterally the pin 32ᵈ thereon will enter the opening 32' on stub lever 32ᵇ, and movement of said lever 32ᵃ toward the point 1 will carry along with it the rod 26, whereby the driving shaft 5 is rotated through the slots hereinbefore described, and the engagement therewith of the pins herein before described to enmesh with pinions 6 and 15, and in this same movement of the lever 32ᵃ pinion 6 is brought into proper meshing position with pinion 15. This latter effect is produced by the movement of the lever 32ᵃ in the slot past the point 2 before a lateral swing is given to said operating lever. If, now, the lever 32ᵃ be returned the first effect will be to swing back the driving shaft 5 by moving rod 26. The next effect will be to return gear 6 away from meshing position with gear 15, and when the operating lever 32ᵃ has been brought back to neutral position it can then be moved laterally to engage the pin 32ᵉ with the opening 32² in stub lever 32ᵇ, and if said operating lever then be advanced toward the point 3, the result will be to move the rod 26 whereby pinion 6 is given a swinging movement laterally into mesh with crown gear 4, thereby producing the second degree of speed. If the operating lever 32ᵃ be now returned to neutral position, gear 6 and crown gear 4 will be released from engagement and then a further movement of the operating lever toward the point R will rock reverse pinion 17 into position to mesh with pinions 7 and 15, thereby giving a reverse movement to the vehicle. It should be stated that the cam end of rod 26 slides in the close engaging portion 36 of the casing which reinforces it and stiffens it in its movement and in its operating position, so that the driving shaft is held rigidly in any position in which it may be swung.

I do not desire to be limited to the specific details of the construction herein shown and described, but desire to have advantage of any equivalent means of producing the shifting movement of the pinions and also the lateral swinging movement, whereby it is made possible to employ pinions of different diameters on the driving shaft, and thereby obtain different degrees of speed without the employment of complicated gear constructions. Essentially I accomplish the desired effects by the use of a large and small pinion slidably mounted on a driving shaft, two stationary pinions on the countershaft, a reverse pinion, and means for sliding the pinions on the driving shaft and also for swinging or rotating the driving shaft to bring the small pinion into mesh, whereby I produce four different speeds.

What I claim is:

1. In a transmission gearing construction, a driven shaft, a crown gear mounted thereon, a driving shaft, pinions of different diameters mounted slidably thereon, and means for moving said driving shaft to bring the smaller pinion thereon into mesh with said crown gear.

2. In a transmission gearing construction, a driven shaft, a crown gear mounted thereon, a driving shaft, pinions of different diameters thereon, the larger of said pinions being adapted to be brought into mesh by a sliding movement with the said crown gear, and means for moving said driving shaft to bring the smaller pinion into mesh with said crown gear.

3. A transmission gearing construction comprising a driven shaft, oppositely faced crown gears thereon, a driving shaft, two pinions of different diameters slidably mounted thereon, a countershaft, a pinion thereon adapted to mesh with one of said crown gears, a second pinion mounted thereon, the larger of said pinions on said driving shaft being adapted to be moved slidably into mesh with one of said crown gears or with said second pinion on said countershaft, means for moving the smaller of said pinions slidably on said driving shaft, and means for moving said driving shaft to bring said smaller pinion into mesh with one of said crown gears or with said second pinion on said countershaft.

4. In a transmission gearing construction a driven shaft, a crown gear thereon, a driving shaft, a relatively large pinion thereon adapted to be slidably brought into mesh with said crown gear, a relatively small pinion thereon, and means for moving said driving shaft to bring said smaller pinion into mesh with said crown gear.

5. In a transmission gearing construction, a driven shaft, a crown gear mounted thereon, a driving shaft, pinions of different diameters mounted on said driving shaft, and rocking means for said driving shaft whereby the smaller of said pinions may be brought into mesh with said crown gear.

6. In a transmission gearing construction, a driven shaft and a crown gear thereon, a driving shaft, two pinions of different diameters slidably mounted thereon, a reverse pinion, means for suspending said driving shaft, and means for rocking said driving shaft and appropriately positioning said reverse pinion.

7. In a transmission gearing construction, a driving shaft, two pinions of different diameters mounted slidably thereon, pivotal suspending means for said shaft, and means for swinging said shaft thereon.

8. In a transmission gearing construction, a driven shaft and a crown gear thereon, a driving shaft, two pinions of different diameters slidably mounted thereon, a reverse pinion, means for suspending said driving shaft, and means for rocking said driving shaft and reverse pinion, whereby said pinion of smaller diameter is brought into meshing position with said crown gear, and said reverse pinion is appropriately positioned.

9. In a transmission gearing construction, a driving shaft, two pinions of different diameters mounted slidably thereon, pivotal suspending means for said shaft, and a controlling device for sliding said pinions and swinging said shaft.

10. In a transmission gearing construction, a driving shaft, two pinions of different diameters mounted slidably thereon, a reverse pinion, pivotal suspending means for said shaft and a controller for manipulating said pinions on said driving shaft, for swinging said shaft, and for positioning said reverse pinion.

11. In a transmission gearing construction, a driving shaft, pinions of different diameters mounted slidably thereon, pivotal suspending means for said shaft, a reverse pinion pivotally mounted, and a controller which at the same operation rocks said reverse pinion and swings said shaft.

In testimony whereof I affix my signature in the presence of two witnesses.

KARL PROBST.

Witnesses:
 GEO. W. RIGHTMIRE,
 G. M. GRIDLEY.